United States Patent
Hayasaka et al.

(10) Patent No.: US 9,284,451 B2
(45) Date of Patent: Mar. 15, 2016

(54) RESIN COMPOSITION AND RESIN MOLDED ARTICLE

(71) Applicant: FUJI XEROX CO., LTD., Tokyo (JP)

(72) Inventors: Satoshi Hayasaka, Kanagawa (JP); Masaya Ikuno, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 14/597,679

(22) Filed: Jan. 15, 2015

(65) Prior Publication Data

US 2016/0024298 A1  Jan. 28, 2016

(30) Foreign Application Priority Data

Jul. 24, 2014 (JP) ................................ 2014-150355

(51) Int. Cl.
*C08K 9/00* (2006.01)
*C08L 69/00* (2006.01)
*C08L 55/02* (2006.01)
*C08L 67/04* (2006.01)

(52) U.S. Cl.
CPC ................ *C08L 69/00* (2013.01); *C08L 55/02* (2013.01); *C08L 67/04* (2013.01)

(58) Field of Classification Search
CPC .............................. C08L 69/00; C08G 63/912

USPC .......................................................... 524/122
See application file for complete search history.

(56) References Cited

U.S. PATENT DOCUMENTS 5,869,553 A * 2/1999 Ueda ....................... C08L 63/00
                                                                  523/208
2014/0073726 A1* 3/2014 Ikuno ...................... C08L 67/04
                                                                  524/122

FOREIGN PATENT DOCUMENTS

JP 2000-336227 A 12/2000
JP 2006-250484 A 9/2006
JP 2008-069299 A 3/2008

OTHER PUBLICATIONS

Machine Translation of JP 2000-336227 (2000).*

* cited by examiner

*Primary Examiner* — Hannah Pak
(74) *Attorney, Agent, or Firm* — Oliff PLC

(57) ABSTRACT

A resin composition includes a polylactic acid resin, an alloy resin of a polycarbonate resin and an acrylonitrile-butadiene rubber-styrene resin, surface-coated red phosphorus whose surface is coated with a hydrophobic resin, and a glycerol fatty acid ester plasticizer, wherein an average coating thickness of the polylactic acid resin and the alloy resin that cover the surface-coated red phosphorus, which is obtained by observing a structure inside a molded article with a TEM in the case of forming the molded article, is 100 nm or more.

10 Claims, No Drawings

RESIN COMPOSITION AND RESIN MOLDED ARTICLE

CROSS-REFERENCE TO RELATED APPLICATIONS

This application is based on and claims priority under 35 USC 119 from Japanese Patent Application No. 2014-150355 filed Jul. 24, 2014.

BACKGROUND

1. Technical Field

The present invention relates to a resin composition and a resin molded article.

2. Related Art

A polymer material such as polystyrene, a polystyrene-ABS resin copolymer, polycarbonate, polyester, polyphenylene sulfide, and polyacetal has been used for components of electric products and electronic and electric equipment since the material is excellent in heat resistance and mechanical strength, and particularly, in the retainability of mechanical strength against circumstantial changes of the components in electronic and electric equipment.

In addition, in recent years, from the viewpoint of environmental issues, there are known a resin composition containing a polylactic acid resin which is a kind of biodegradable polymer, and a molded article obtained using such a resin composition.

SUMMARY

According to an aspect of the invention, there is provided a resin composition including:

a polylactic acid resin;

an alloy resin of a polycarbonate resin and an acrylonitrile-butadiene rubber-styrene resin;

surface-coated red phosphorus whose surface is coated with a hydrophobic resin; and a glycerol fatty acid ester plasticizer, wherein an average coating thickness of the polylactic acid resin and the alloy resin that cover the surface-coated red phosphorus, which is obtained by observing a structure inside a molded article with a TEM in the case of forming the molded article, is 100 nm or more.

DETAILED DESCRIPTION

Exemplary embodiments of the invention will be hereunder described. The exemplary embodiments are an example for carrying out the invention, and it should not be construed that the invention is limited to the exemplary embodiments.

A resin composition according to an exemplary embodiment of the invention includes a polylactic acid, an alloy resin of a polycarbonate resin and an acrylonitrile-butadiene rubber-styrene resin (hereinafter, simply referred to as a "polycarbonate/ABS resin" in some cases), surface-coated red phosphorus whose surface is coated with a hydrophobic resin, and a glycerol fatty acid ester plasticizer. The average coating thickness of the polylactic acid resin and the polycarbonate/ABS resin that cover the surface-coated red phosphorus, which is obtained by observing the structure inside a molded article with a TEM in the case of forming the molded article, is 100 nm or more. Thus, the flame retardancy and the impact resistance are excellent in the case of forming a molded article.

In the related art, the flame retardancy has been imparted when a molded article is formed by adding a red phosphorus flame retardant to a resin composition including an alloy resin such as a polycarbonate/ABS resin. However, the impact resistance is deteriorated in some cases. This is because the red phosphorus flame retardant is a solid of a micron order and thus functions as a foreign substance in the resin composition, and the foreign substance functions as a fracture point when tensile stress and impact stress are applied. The inventors have found that when the average coating thickness of a polylactic acid resin and a polycarbonate/ABS resin that cover surface-coated red phosphorus, which is obtained by observing a structure of a molded article with a TEM in the case of forming the molded article by containing the surface-coated red phosphorus whose surface is coated with a hydrophobic resin, and a glycerol fatty acid ester plasticizer in a resin composition including an aliphatic polyester resin and the polycarbonate/ABS resin, is set to 100 nm or more, the flame retardancy and the impact resistance are excellent in the case of forming a molded article.

Since glycerol fatty acid ester that generally functions as a plasticizer has a structure including a hydrophilic group and a hydrophobic group, glycerol fatty acid ester acts on an interface between the surface-coated red phosphorus which is a hydrophobic material and the polycarbonate/ABS resin which is a hydrophilic resin and the adhesion between the surface-coated red phosphorus and the polycarbonate/ABS resin is improved. As a result, the surface-coated red phosphorus does not easily function as a fracture point and therefore the impact resistance is enhanced while the flame retardancy is barely affected.

The average coating thickness of the polylactic acid resin and the polycarbonate/ABS resin that cover surface-coated red phosphorus, which is obtained by observing the structure of a molded article with a TEM in the case of forming the molded article, is 100 nm or more, and is preferably 200 nm or more. The larger the average coating thickness is, the better it is. However, the upper limit is, for example, 500 nm or less. When the average coating thickness is less than 100 nm, the impact resistance is insufficient.

Polylactic Acid Resin

The resin composition according to the exemplary embodiment includes a polylactic acid resin as a resin component. The polylactic acid resin is derived from plants and has an effect of decreasing the environmental load, specifically, for example, decreasing the amount of $CO_2$ to be emitted and decreasing the amount of petroleum to be used. The polylactic acid resin is not particularly limited so long as it is a condensate of lactic acids, and may be a poly-L-lactic acid (hereinafter, also referred to as "PLLA"), a poly-D-lactic acid (hereinafter, also referred to as "PDLA"), a mixture of PLLA and PDLA obtained by copolymerization or blending thereof. Further, the polylactic acid resin may be a stereo-complex type polylactic acid which is a mixture of poly-L-lactic acid and poly-D-lactic acid and has high heat resistance, in which helical structures thereof are combined (hereinafter, also referred to as "SC-PLA").

The component ratio (molar ratio %) of the poly-L-lactic acid to the poly-D-lactic acid in the copolymer or the blend is not particularly limited, but from the viewpoint that a lactic acid having higher purity of an enantiomer is highly crystallized and has high heat resistance, it is preferable that the ratio of L-lactic acid/D-lactic acid be in the range of 50/50 to 99.99/0.01. When the ratio of L-lactic acid/D-lactic acid is less than 50/50, the mechanical properties are sometimes deteriorated in the case of forming a molded article, and when the ratio is more than 99.99/0.01, the cost sometimes increases.

As the polylactic acid resin, synthesized products or commercially available products may be used. Examples of the commercially available products include "TERRAMAC TE4000", "TERRAMAC TE2000", and "TERRAMAC TE7000", all manufactured by Unitika Ltd., "Ingeo 3251D", "Ingeo 3001D", and "Ingeo 4032D", all manufactured by NatureWorks LLC, and "REVODE 110" and "REVODE 190", all manufactured by Zhejing Hisun Biochemicals Co., Ltd. Further, the polylactic acid resins may be used singly or in combination of two or more kinds thereof.

The polylactic acid resin may further contain copolymerization components other than lactic acid, such as ethylene glycol and dibutanol, which are derived from plants. The content of these copolymerization components may be usually from 1 mol % to 50 mol % in the entire monomer components. Further, as the polylactic acid resin, modified ones, for example, a maleic anhydride-modified polylactic acid, an epoxy-modified polylactic acid, an amine-modified polylactic acid, or the like may be used.

The molecular weight of the polylactic acid resin is not particularly limited, but in the exemplary embodiment, the weight average molecular weight of the polylactic acid resin is preferably in the range of 50,000 to 300,000, and more preferably in the range of 70,000 to 250,000. When the weight average molecular weight of the polylactic acid resin is less than 50,000, the mechanical properties are sometimes deteriorated in the case of forming a molded article, and when the weight average molecular weight of the polylactic acid is more than 300,000, the processability sometimes becomes poor.

The glass transition temperature of the polylactic acid resin is not particularly limited, but it is preferably in the range of 100° C. to 250° C., and more preferably in the range of 120° C. to 200° C. When the glass transition temperature of the polylactic acid resin is lower than 100° C., the mechanical properties are sometimes deteriorated in the case of forming a molded article, and when the glass transition temperature of the polylactic acid resin is higher than 250° C., the processability sometimes becomes poor.

The polylactic acid resin may contain lactone compounds of cyclic lactones such as butylollactone and 1,6-dioxacyclodecane-2,7-dione, and the like as the impurities sometimes in the preparation. The content of the impurities such as lactone compounds is preferably low, and specifically, the content of the impurities is less than 10% by weight, and more preferably less than 5% by weight with respect to the polylactic acid. When the content of the impurities such as lactone compounds is 10% by weight or more, the lactone compounds and the like are reacted with a polycarbonate/epoxy compound and the like and thus, the reactivity with a polyamide is lowered. As a result, the mechanical properties are sometimes deteriorated in the case of forming a molded article.

Polycarbonate/ABS Resin

The resin composition according to the exemplary embodiment includes an alloy resin of a polycarbonate resin and an acrylonitrile-butadiene rubber-styrene resin as a resin component, in addition to the polylactic acid resin. The impact resistance is improved by containing the polycarbonate/ABS resin.

The polycarbonate resin is obtained by polycondensation of one or plural monomers, and is not particularly limited as long as it is a polymer having at least one carbonate group, but examples thereof include aromatic polycarbonates such as a bisphenol A type polycarbonate, a bisphenol S type polycarbonate, and a biphenyl type polycarbonate.

The acrylonitrile-butadiene rubber-styrene resin (ABS resin) is a copolymer of acrylonitrile, butadiene rubber, and styrene.

As the polycarbonate/ABS resin, synthesized products or commercially available products may be used. Examples of the commercially available products include "PANLITE TN7300" (polycarbonate/ABS alloy resin), manufactured by Teijin Chemicals Ltd. In addition, the polycarbonate/ABS resins may be used singly or in combination of two or more kinds thereof.

The molecular weight of the polycarbonate/ABS resin is not particularly limited, but in the exemplary embodiment, the weight average molecular weight of the polycarbonate/ABS resin is preferably in the range of 5,000 to 300,000, and more preferably in the range of 10,000 to 150,000. When the weight average molecular weight of the polycarbonate/ABS resin is less than 5,000, the processability is sometimes deteriorated due to excess fluidity, and when the weight average molecular weight of the polycarbonate/ABS resin is more than 300,000, the processability is sometimes deteriorated due to insufficient fluidity.

The glass transition temperature of the polycarbonate/ABS resin is not particularly limited, but it is preferably in the range of 80° C. to 200° C., and more preferably in the range of 90° C. to 180° C. When the glass transition temperature of the polycarbonate/ABS resin is lower than 80° C., the heat resistance is sometimes insufficient in the case of forming a molded article, and when the glass transition temperature of the polycarbonate/ABS resin is higher than 200° C., the processability is sometimes insufficient.

The content of the polylactic acid resin is in a range of 25% by weight to 80% by weight and preferably in a range of 30% by weight to 70% by weight with respect to the total content of the resin components. When the content of the polylactic acid resin is less than 25% by weight with respect to the total content of the resin components, the environmental load is increased in some cases and when the content is more than 80% by weight, the flame retardancy and the impact resistance are sometimes deteriorated in the case of forming a molded article.

The content of the polycarbonate/ABS resin is in a range of 20% by weight to 75% by weight and preferably in a range of 30% by weight to 70% by weight with respect to the total content of the resin components. When the content of the polycarbonate/ABS resin is less than 20% by weight with respect to the total content of the resin components, the flame retardancy and the impact resistance are sometimes deteriorated in the case of forming a molded article, and when the content is more than 75% by weight, the environmental load is increased in some cases.

The polycarbonate/ABS resin may be a collected resin that is collected from the market. Then, a collected resin that is collected from the market is effectively used, the cost is reduced, and thus, the environmental properties are excellent. When recycled materials formed by alloying the polycarbonate/ABS resin that is collected from the market and the polylactic acid resin are used as the resin composition according to the exemplary embodiment, it is possible to obtain a resin composition having excellent environmental properties and excellent flame retardancy and impact resistance in the case of forming a molded article at reduced cost.

Surface-Coated Red Phosphorus

Red phosphorus is a mixture with other allotropes having violet phosphorus as a main component. The surface-coated red phosphorus is one formed by coating the surface of red phosphorus with a hydrophobic resin. When the surface-coated red phosphorus is added, the flame retardancy or the like is improved.

Examples of the hydrophobic resin include a phenol resin, an unsaturated polyester resin, and an epoxy resin. From the viewpoint of imparting stability to the red phosphorus and ease of availability, the phenol resin is preferable.

The molecular weight of the hydrophobic resin is not particularly limited, but in the exemplary embodiment, the molecular weight of the hydrophobic resin is preferably in a range of 500 to 20,000, and more preferably in a range of 500 to 5,000. When the weight average molecular weight of the hydrophobic resin is less than 500, the surface of red phosphorus is not coated in some cases, and even when the weight average molecular weight of the hydrophobic resin is more than 20,000, the surface of red phosphorus is not coated in some cases.

The proportion of the red phosphorus in the surface-coated red phosphorus is not particularly limited, but the proportion is preferably 80% by weight or more and more preferably 90% by weight or more. When the proportion of the red phosphorus in the surface-coated red phosphorus is less than 80% by weight, the flame retardancy cannot be sometimes imparted in the case of forming a molded article. Further, the proportion of the red phosphorus in the surface-treated red phosphorus is adjusted by, for example, adjusting the surface coating amount with respect to the red phosphorus.

The average particle diameter of the surface-coated red phosphorus is preferably 20 µm or less, and more preferably 5 µm or less. When the average particle diameter of the surface-coated red phosphorus is more than 20 µm, in the case of forming a molded article, when an impact is applied, the phosphorus particle functions as a fracture point and thus the impact strength is greatly deteriorated in some cases.

As the surface-coated red phosphorus, synthesized products or commercially available products may be used. Examples of the commercially available products include "NOVA RED 120" (manufactured by Rin Kagaku Kogyo Co., Ltd.), a surface-coated product with a phenolic resin. In addition, the surface-coated red phosphorus may be used singly or in combination of two or more kinds thereof.

The content of the surface-coated red phosphorus is in a range of 1% by weight to 10% by weight and preferably in a range of 3% by weight to 7% by weight with respect to the total content of the resin components. When the content of the surface-coated red phosphorus is less than 1% by weight with respect to the total content of the resin components, the flame retardancy is sometimes deteriorated in the case of forming a molded article. When the content is more than 10% by weight, the impact resistance is sometimes deteriorated in the case of forming a molded article.

Glycerol Fatty Acid Ester Plasticizer

Glycerol fatty acid ester is an ester compound obtained by esterifying glycerols and fatty acid.

Examples of the glycerols include glycerols such as glycerol, diglycerol, triglycerol, tetraglycerol, pentaglycerol, hexaglycerol, pentaglycerol, octaglycerol, nonaglycerol, and decaglycerol. Diglycerol and triglycerol are preferably used. The glycerols may be used singly or in combination of two or more kinds thereof.

Examples of the fatty acid include fatty acids such as lauric acid, myristic acid, palmitic acid, palmitoleic acid, stearic acid, oleic acid, linoleic acid, linolenic acid, nonadecanoic acid, arachidic acid, gadoleic acid, eicosadienoic acid, arachidonic acid, behenic acid, erucic acid, docosadienoic acid, lignoceric acid, isostearic acid, ricinoleic acid, 12-hydroxy stearic acid, 9-hydroxy stearic acid, 10-hydroxy stearic acid, and hydrogenated castor oil fatty acid (fatty acid containing a small amount of stearic acid other than 12-hydroxy stearic acid and palmitic acid), having 1 to 100 carbon atoms. Palmitic acid, stearic acid, and oleic acid are preferably used. The fatty acids may be used singly or in combination of two or more kinds thereof.

A method of producing glycerol fatty acid ester is not particularly limited but, for example, may be obtained by heating the above-described glycerols and fatty acid to a temperature in a range of, for example, from 100° C. to 300° C., and preferably, from 120° C. to 260° C., under the presence of a catalyst such as phosphoric acid, p-toluenesulfonic acid, or caustic soda or without a catalyst, and removing formed water to the outside of the system. The reaction is preferably carried out under the presence of an inert gas. In addition, the reaction may be carried out in an azeotropic solvent such as toluene or xylene. Specific examples of the glycerol fatty acid ester thus obtained include diglycerol palmitic acid ester, diglycerol stearic acid ester, diglycerol oleic acid ester, decaglycerol palmitic acid ester, decaglycerol stearic acid ester, and decaglycerol oleic acid ester. Among these, diglycerol stearic acid ester and decaglycerol stearic acid ester are preferable.

As the glycerol fatty acid ester, synthesized products or commercially available products may be used. Examples of the commercially available products include "CHIRABAZOL P4", "CHIRABAZOL VR-01" (polyglycerol fatty acid ester), "CHIRABAZOL H-818" (polyglycerol condensed hydroxy fatty acid ester), all manufactured by Taiyo Kagaku Co., Ltd. In addition, the glycerol fatty acid esters may be used singly or in combination of two or more kinds thereof.

The molecular weight of the glycerol fatty acid ester is not particularly limited, but in the exemplary embodiment, the molecular weight of the glycerol fatty acid ester is preferably 800 or more and more preferably in a range of 800 to 4,000. When the weight average molecular weight of the glycerol fatty acid ester is less than 800, the adherence effect at the interface in the development of strength is weaken in some cases, and when the weight average molecular weight of the glycerol fatty acid ester is more than 4,000, the flame retardancy is deteriorated in some cases.

The content of the glycerol fatty acid ester plasticizer is in a range of 1% by weight to 15% by weight and preferably in a range of 3% by weight to 7% by weight with respect to the total content of the resin components. When the content of the glycerol fatty acid ester plasticizer is less than 1% by weight with respect to the total content of the resin components, the impact resistance is sometimes deteriorated in the case of forming a molded article and when the content is more than 10% by weight, the flame retardancy is sometimes deteriorated in the case of forming a molded article.

Other Additives

As additives other than the surface-coated red phosphorus and the glycerol fatty acid ester plasticizer, as necessary, a flame retardant, an antioxidant, a filler, a drip preventing agent, and the like may be used. The contents of these components are preferably 10% by weight or less, respectively, based on the entire solid content of the resin composition.

When the resin composition contains a flame retardant, in the case of being formed into a molded article, the flame retardancy is improved. The flame retardant is not particularly limited, and those which are generally used as a flame retardant for resins are useful. Examples of the flame retardant include inorganic flame retardants and organic flame retardants. Specific examples of the inorganic flame retardant include magnesium hydroxide, aluminum hydroxide, silicon dioxide and silica flame retardants such as low-melting glass.

Specific examples of the organic flame retardant include phosphoric acid salt compounds and phosphoric ester compounds. Among the above examples, phosphoric acid salt compounds, particularly, ammonium polyphosphates, are preferable as the flame retardant used in the exemplary embodiment from the viewpoint of flame retardant efficiency and the like. The flame retardants may be used singly or in combination of two or more kinds thereof.

Examples of the antioxidant include phenol-based, amine-based, phosphorous-based, sulfur-based, hydroquinone-based, and quinoline-based antioxidants. The antioxidants may be used singly or in combination of two or more kinds thereof.

Examples of the filler include clay such as kaolin, bentonite, kibushi clay, and gaerome clay, talc, mica, and montmorillonite. The fillers may be used singly or in combination of two or more kinds thereof.

When the resin composition contains a drip preventing agent, in the case of being formed into a molded article, the drip resistance (resistance to melt dripping) is improved. As the drip preventing agent, synthesized products or commercially available products may be used. Examples of the commercially available product include "PTFE CD145", manufactured by Asahi Glass Co., Ltd., and "FA500H", manufactured by Daikin Industries, Ltd., all of which are polytetrafluoroethylene (PTFE). The drip preventing agent may be used singly or in combinations of two or more kinds thereof.

Various Measurement Methods

The contents of the polylactic acid resin, the polycarbonate/ABS resin, and the glycerol fatty acid ester plasticizer in the resin composition are measured by $^1$H-NMR analysis. The content of the impurities such as lactone compounds included in the polylactic acid in the resin composition is measured by the same method. The contents of the polylactic acid resin, the polycarbonate/ABS resin, and the glycerol fatty acid ester plasticizer in the resin molded article obtained using the resin composition are measured by $^1$H-NMR analysis. From the contents of the polylactic acid resin, the polycarbonate/ABS resin, and the glycerol fatty acid ester plasticizer in the resin molded article thus measured, the contents of the polylactic acid resin, the polycarbonate/ABS resin, and the glycerol fatty acid ester plasticizer in the resin composition are estimated.

The weight average molecular weight of the polylactic acid resin, the polycarbonate/ABS resin, and the glycerol fatty acid ester plasticizer in the resin composition is obtained by dissolving a polymer in a solvent, and using the solution by means of size exclusion chromatography (GPC). The compounds are dissolved in tetrahydrofuran (THF) and analyzed by molecular weight distribution measurement (GPC). The weight average molecular weights of the polylactic acid resin, the polycarbonate/ABS resin, and the glycerol fatty acid ester plasticizer in the resin molded article obtained using the resin composition are obtained by dissolving a polymer in a solvent, and using the solution by means of size exclusion chromatography (GPC). The compounds are dissolved in tetrahydrofuran (THF) and analyzed by molecular weight distribution measurement (GPC).

The glass transition temperature of the polylactic acid resin, the polycarbonate/ABS resin, and the glycerol fatty acid ester plasticizer in the resin composition is measured by a method of JIS K 7121 using a thermal analyzer (DSC6000 type, manufactured by SII NanoTechnology Inc.). The glass transition temperature of the polylactic acid resin, the polycarbonate/ABS resin, and the glycerol fatty acid ester plasticizer in the resin molded article obtained using the resin composition is measured by a method of JIS K 7121 using a thermal analyzer (DSC6000 type, manufactured by SII NanoTechnology Inc.).

In the resin composition and the resin molded article obtained using the resin composition, by measuring the structure and composition ratio of each of the materials using an elemental analyzer, an NMR apparatus, an IR apparatus or the like, the contents of the other additives in the resin composition and in the resin molded article may be measured. In addition, from the contents of the other additives in the resin molded articles, the contents of other additives in the resin composition are estimated.

The content of the surface-coated red phosphorus in the resin composition is measured by a pyrolysis gas chromatograph mass analyzing method. The content of the surface-coated red phosphorus in the resin molded article obtained using the resin composition is also measured by the same method.

Identification of the surface treatment of the surface of the red phosphorus is measured by NMR or IR.

The proportion of the surface-coated red phosphorus in the resin composition is measured by colorimetric analysis. The proportion of the surface-coated red phosphorus in the resin molded article obtained using the resin composition is measured by SEM-EDX.

The average particle diameter of the surface-coated red phosphorus in the resin composition is measured by a laser Raman spectrometer LabRAM ARAMIS manufactured by HORIBA, Ltd. at a laser wavelength of 633 nm. As for the average particle diameter, a circle-equivalent diameter is measured by image processing by Raman chemical imaging of the component distributions by main component analysis, which is one type of multivariate analysis, using OMNIC AT1 µs software and the average value of the number average particle diameters D50 of five particles is determined as the average particle diameter. The average particle diameter of the surface-coated red phosphorus in the resin molded article is also measured by the same method.

The average coating thickness of the polylactic acid resin and the polycarbonate/ABS resin that cover the surface-coated red phosphorus, which is obtained by observing the structure inside a molded article with a TEM in the case of forming the molded article, is measured by the following manner. Small pieces perpendicular to the emitting direction are cut out from an ISO multipurpose dumbbell test piece and fixed and treated with $OsO_4$ for 19 hours at 60° C. Further, the small pieces are dyed with $RuO_4$ at 60° C. for 2 hours and then, the above test piece is cut into pieces having a thickness of 100 nm or less using a microtome (FC-4E type, manufactured by LEICA) with a diamond knife. The cut pieces are observed with a transmission electron microscope (TECNAI type, manufactured by FEI Company). From the obtained TEM image, the coating thickness of the polylactic acid resin and the polycarbonate/ABS resin present on the surface of the surface-coated red phosphorus is measured and averaged to obtain an average coating thickness (nm). The polylactic acid resin and the polycarbonate/ABS resin that cover the surface-coated red phosphorus, and the hydrophobic resin that covers the red phosphorus are distinguished from each other by spectroscopy in which atomic force microscopy (AFM) using a nano IR and infrared spectroscopy are combined.

Since a molecular weight is typically reduced in a collected rein due to aging deterioration and heat history, the fact that the polycarbonate/ABS resin is a collected resin that is collected from the market may be determined based on a molecular weight that is reduced compared to an initial product when the weight average molecular weight is measured as described above.

Method of Producing Resin Composition

The resin composition according to the exemplary embodiment may be prepared by kneading, for example, a polylactic acid resin, a polycarbonate/ABS resin, surface-coated red phosphorus, a glycerol fatty acid ester plasticizer, and as necessary, other additives.

The kneading may be carried out using a known kneading device such as, for example, a twin-screw kneading device (TEM58SS, manufactured by Toshiba Machine Co., Ltd.), and a simple kneading device (LABOPLASTOMILL, manufactured by Toyo Seiki Seisaku-sho, Ltd.). Here, the temperature conditions for kneading (cylinder temperature conditions) are preferably, for example, in the range of 170° C. to 220° C., more preferably in the range of 180° C. to 220° C., and even more preferably in the range of 190° C. to 220° C. Thus, a molded article having excellent flame retardancy and impact resistance may be easily obtained.

Resin Molded Article

The resin molded article according to the exemplary embodiment may be obtained by molding the above-described resin composition according to the exemplary embodiment.

For example, by a molding method such as injection molding, extrusion molding, blow molding, and thermal press molding, the resin composition according to the exemplary embodiment is molded to obtain the resin molded article according to the exemplary embodiment. For the reasons of the productivity or the like, the resin molded article according to the exemplary embodiment is preferably obtained by injection molding the resin composition according to the exemplary embodiment.

The injection molding may be carried out using commercially available devices such as, for example, "NEX150" manufactured by Nissei Plastic Industrial Co., Ltd., "NEX70000" manufactured by Nissei Plastic Industrial Co., Ltd., and "SE50D" manufactured by Toshiba Machine Co., Ltd. At this point, the cylinder temperature is preferably in the range of 170° C. to 250° C., and more preferably in the range of 180° C. to 240° C. from the viewpoint of prevention of the decomposition of resins. Further, the mold temperature is preferably in the range of 30° C. to 100° C., and more preferably in the range of 30° C. to 60° C., from the viewpoint of the productivity or the like.

The resin molded article according to the exemplary embodiment has excellent flame retardancy and impact resistance.

Components of Electronic and Electric Equipment

The resin molded article according to the exemplary embodiment is suitably used for electronic or electric equipment, an electric home appliance, a container, or an automotive interior since the resin molded article has excellent mechanical strength (impact resistance, tensile elastic modulus, and the like). More specifically, the resin molded article according to the exemplary embodiment is suitable for housings of electric home appliances, electronic and electric equipment, and the like, various components, or the like, wrapping films, storage cases of CD-ROM, DVD, or the like, tableware, food trays, beverage bottles, drug wrapping materials, and the like. Among them, the resin molded article according to the exemplary embodiment is particularly suitable for the components of electronic and electric equipment. The components of electronic and electric equipment frequently have complex shapes and are heavy products, and thus, are required to have high impact resistance, as compared with a case of not being heavy products. However, according to the resin molded article according to the exemplary embodiment, these requirements are sufficiently satisfied. The resin molded article according to the exemplary embodiment is particularly suitable for housings of an image forming device, a copying machine, or the like.

EXAMPLES

Hereinafter, the invention will be described in more detail with reference to Examples and Comparative Examples, but the invention is not limited to the following Examples.

EXAMPLES AND COMPARATIVE EXAMPLES

Raw materials are blended with a composition (parts by weight) shown in Table 1 are put into a twin-screw kneading device (TEM58SS, manufactured by Toshiba Machine Co., Ltd.), and kneaded at a cylinder temperature of 200° C. to obtain a resin composition (compound). Next, the obtained resin composition is molded using an injection molding machine (NEX150E, manufactured by Nissei Plastic Industrial Co., Ltd.,) at a cylinder temperature of 190° C. and a mold temperature of 100° C. to obtain a test piece for evaluation. The trade name and maker name of each component shown in Table 1 are shown in Table 2.

Evaluation Method

Coating Thickness of Polylactic Acid Resin and Polycarbonate/ABS Resin Covering Surface-Coated Red Phosphorus The coating thickness of the polylactic acid resin and the polycarbonate/ABS resin that cover the surface-coated red phosphorus is measured by the above-described method. The measurement is carried out at 6 points and the average value thereof is set as a coating thickness (nm).

Flame Retardancy

A V test as defined in UL94 is carried out with a thickness of a test piece of 1.6 mm. Further, as the results of the burning test, the level is lowered in the order of V-0, V-1, V-2, and V-not.

Impact Strength (Impact Resistance)

A Charpy impact resistance strength ($kJ/m^2$) is measured according to a method as defined in IOS-179 using an ISO multipurpose dumbbell test piece which is notch-processed by means of an impact resistance tester (DG-5, manufactured by Toyo Seiki Co., Ltd.). Evaluation is carried out based on the following criteria. The results are shown in Tables 1 and 2.

A: 5 or more
B: 3 or more and less than 5
C: less than 3

TABLE 1

|  | Polylactic acid resin | | Polycarbonate/ ABS resin | | Red phosphorus | | Glycerol fatty acid ester | | Antioxidant | | Drip preventing agent | | Surface coating thickness (nm) | Impact resistance ($kJ/m^2$) | Flame retardancy |
|---|---|---|---|---|---|---|---|---|---|---|---|---|---|---|---|
| Example 1 | A2 | 30 | B1 | 70 | C1 | 3 | D1 | 4 | E1 | 0.2 | F1 | 0.2 | 135 | 9.6 | V-1 |
| Example 2 | A2 | 50 | B1 | 50 | C1 | 6 | D1 | 3 | E1 | 0.2 | F1 | 0.2 | 135 | 5.1 | V-0 |
| Example 3 | A2 | 50 | B1 | 50 | C1 | 6 | D1 | 5 | E1 | 0.2 | F1 | 0.2 | 135 | 5.4 | V-0 |
| Example 4 | A2 | 60 | B1 | 40 | C1 | 7 | D1 | 7 | E1 | 0.2 | F1 | 0.2 | 135 | 5.1 | V-1 |

TABLE 1-continued

|  | Polylactic acid resin | | Polycarbonate/ABS resin | | Red phosphorus | | Glycerol fatty acid ester | | Antioxidant | | Drip preventing agent | | Surface coating thickness (nm) | Impact resistance (kJ/m$^2$) | Flame retardancy |
|---|---|---|---|---|---|---|---|---|---|---|---|---|---|---|---|
| Example 5 | A2 | 30 | B1 | 70 | C1 | 3 | D2 | 1 | E1 | 0.2 | F1 | 0.2 | 135 | 7.7 | V-1 |
| Example 6 | A2 | 50 | B2 | 50 | C1 | 6 | D2 | 5 | E1 | 0.2 | F1 | 0.2 | 135 | 5 | V-2 |
| Example 7 | A1 | 30 | B1 | 70 | C1 | 6 | D1 | 3 | E1 | 0.2 | F1 | 0.2 | 135 | 6.6 | V-1 |
| Example 8 | A2 | 30 | B1 | 70 | C1 | 3 | D3 | 1 | E1 | 0.2 | F1 | 0.2 | 135 | 6.2 | V-1 |
| Example 9 | A2 | 50 | B1 | 50 | C1 | 2 | D1 | 2 | E1 | 0.2 | F1 |  | 100 | 6.0 | V-2 |
| Comparative Example 1 | A2 | 30 | B1 | 70 | C1 | 3 | D1 |  | E1 | 0.2 | F1 | 0.2 | 76 | 4.1 | V-1 |
| Comparative Example 2 | A2 | 50 | B1 | 50 | C1 | 6 | D1 |  | E1 | 0.2 | F1 | 0.2 | 76 | 2.9 | V-0 |
| Comparative Example 3 | A2 | 60 | B1 | 40 | C1 | 7 | D1 |  | E1 | 0.2 | F1 | 0.2 | 76 | 1.6 | V-1 |
| Comparative Example 4 | A2 | 30 | B1 | 70 | C1 |  | D1 | 4 | E1 | 0.2 | F1 | 0.2 | 76 | 10.1 | V-not |
| Comparative Example 5 | A2 | 50 | B1 | 50 | C1 | 1 | D1 |  | E1 | 0.2 | F1 | 0.2 | 90 | 3.9 | V-not |

TABLE 2

|  |  | Trade name | Maker | Remarks |
|---|---|---|---|---|
| Polylactic acid resin | A1 | Ingeo 3001D | NatureWorks | Weight average molecular weight: 220,000<br>Content of D body in polylactic acid: 1.4% |
|  | A2 | Ingeo 4032D | NatureWorks | Weight average molecular weight: 170,000<br>Content of D body in polylactic acid: 1.4% |
| Polycarbonate/ABS resin | B1 | PANLITE TN7300 | Teijin Chemicals | Weight average molecular weight: 50,000 |
|  | B2 | PANLITE TN7300 | Teijin Chemicals | Crushed material of each test piece obtained by repeating process of pulverizing each test piece prepared by using PANLITE TN7300 and re-preparing each test piece using pulverized test pieces as raw material 5 times<br>Weight average molecular weight: 10,000 to 50,000 |
| Red phosphorus | C1 | NOVA RED 120 | Rin Kagaku Kogyo | Surface-coated red phosphorus coated with phenol resin |
| Glycerol fatty acid ester | D1 | CHIRABAZOL P4 | Taiyo Kagaku | Polyglycerol fatty acid ester (Mw 800) |
|  | D2 | CHIRABAZOL H-818 | Taiyo Kagaku | Polyglycerol condensed hydroxy fatty acid ester (Mw 2300) |
|  | D3 | RIKEMAL S-100A | Riken Vitamin | Glycerol monostearate (Mw 343) |
| Antioxidant | E1 | Irganox245 | BASF | Ethylene bis(oxyethylene) bis[3-(5-tert-butyl-4-hydroxy-m-tolyl)propionate] |
| Drip preventing agent | F1 | FA500H | Daikin Industries | PTFE |

As shown above, the resin compositions of Examples have excellent flame retardancy and impact resistance when being formed into molded articles, compared to the resin compositions of Comparative Examples.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A resin composition comprising:
a polylactic acid resin;
an alloy resin of a polycarbonate resin and an acrylonitrile-butadiene rubber-styrene resin;
surface-coated red phosphorus whose surface is coated with a hydrophobic resin; and
a glycerol fatty acid ester plasticizer,
wherein an average coating thickness of the polylactic acid resin and the alloy resin that cover the surface-coated red phosphorus, which is obtained by observing a structure inside a molded article with a TEM in the case of forming the molded article, is 100 nm or more.

2. The resin composition according to claim 1, wherein the hydrophobic resin is a phenol resin.

3. The resin composition according to claim 1, wherein a weight average molecular weight of the glycerol fatty acid ester plasticizer is 800 or more.

4. The resin composition according to claim 2, wherein a weight average molecular weight of the glycerol fatty acid ester plasticizer is 800 or more.

5. The resin composition according to claim 1, wherein the alloy resin is a recycled resin.

6. The resin composition according to claim 2, wherein the alloy resin is a recycled resin.

7. The resin composition according to claim 3, wherein the alloy resin is a recycled resin.

8. The resin composition according to claim 4, wherein the alloy resin is a recycled resin.

9. A resin molded article that is obtained by molding the resin composition according to claim 1.

10. A resin molded article that is obtained by molding the resin composition according to claim 2.

* * * * *